March 9, 1954 — R. W. HILTON — 2,671,575
POWDER STORAGE AND DISPENSING APPARATUS
Filed April 24, 1951 — 5 Sheets-Sheet 1
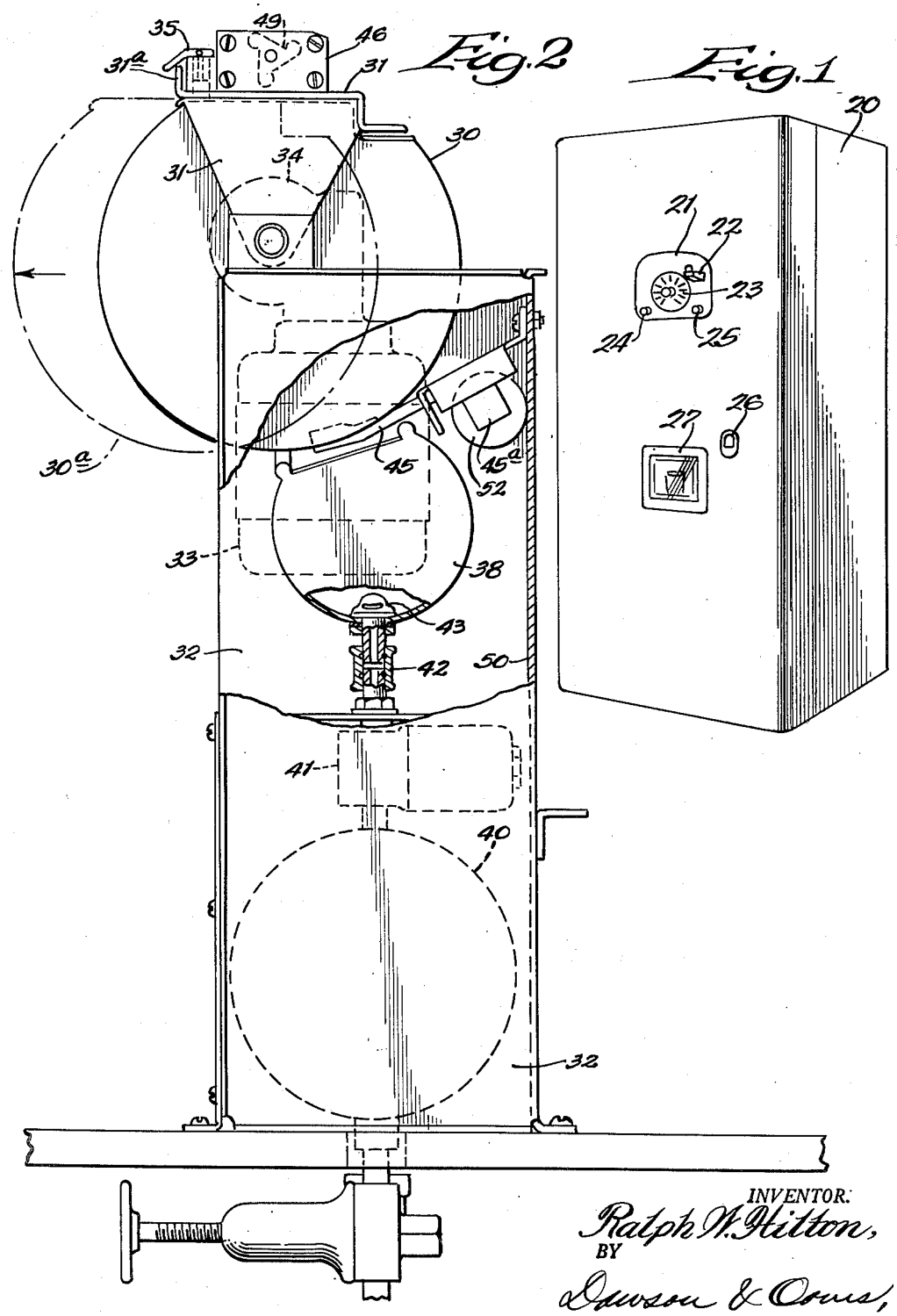
INVENTOR.
Ralph W. Hilton,
BY
Dawson & Ooms,
ATTORNEYS.

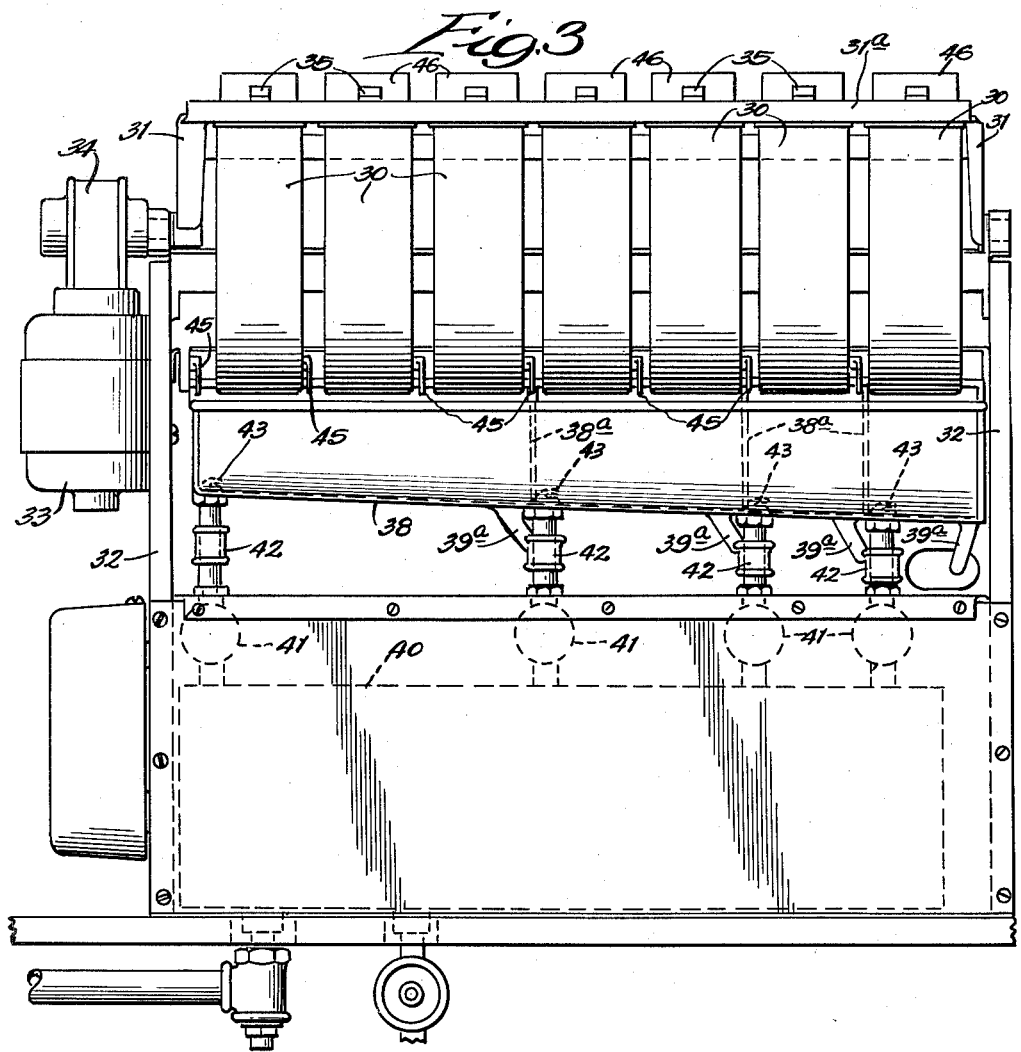

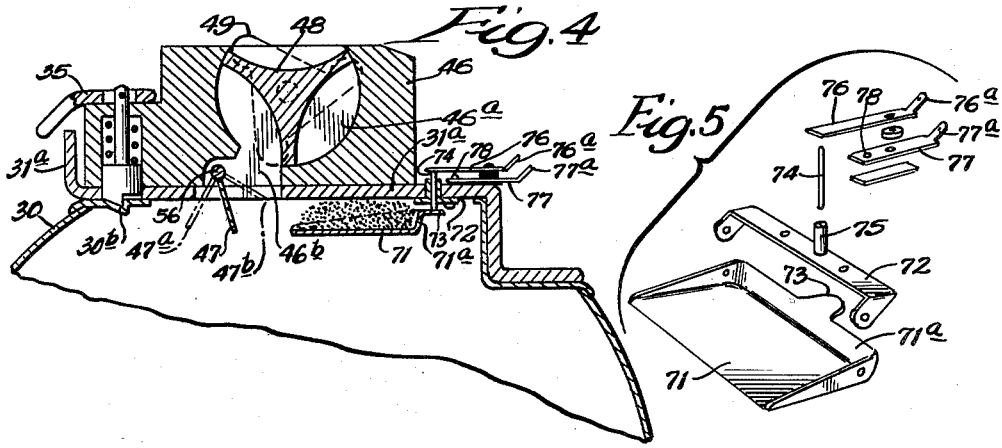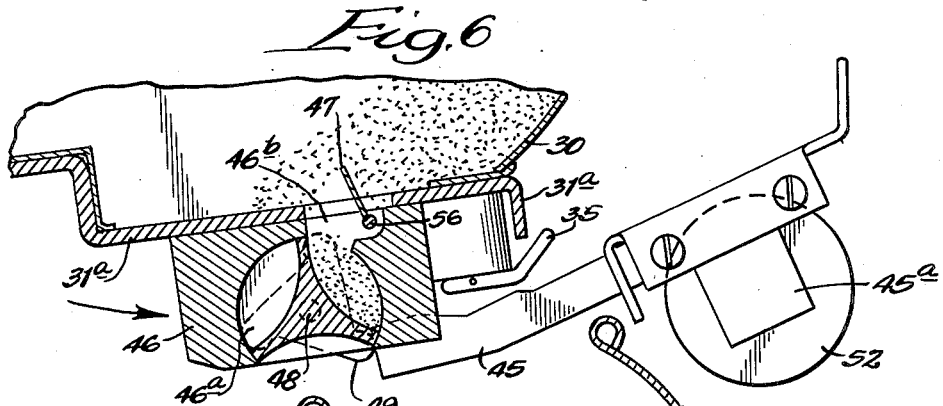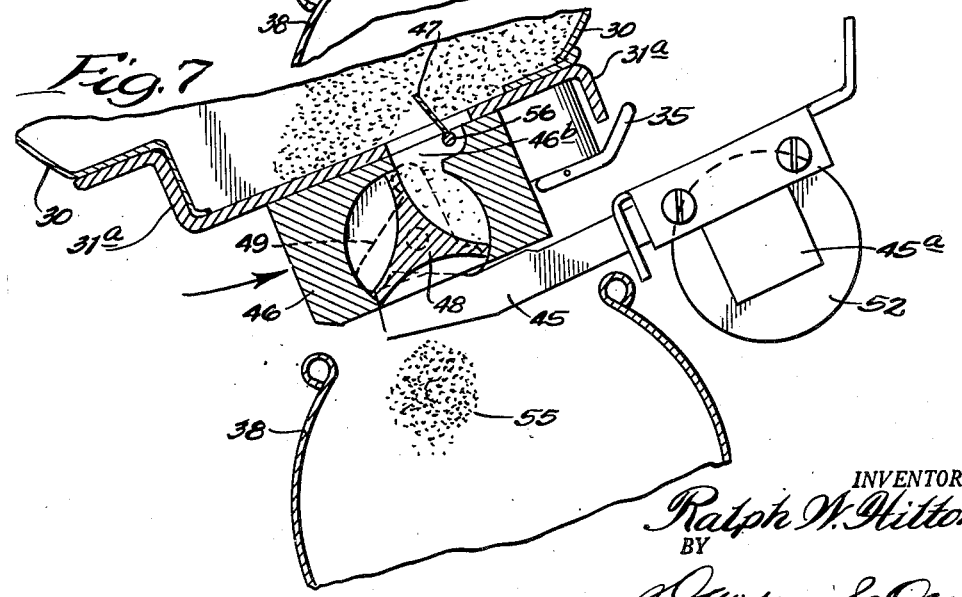

March 9, 1954 R. W. HILTON 2,671,575
POWDER STORAGE AND DISPENSING APPARATUS
Filed April 24, 1951 5 Sheets—Sheet 4
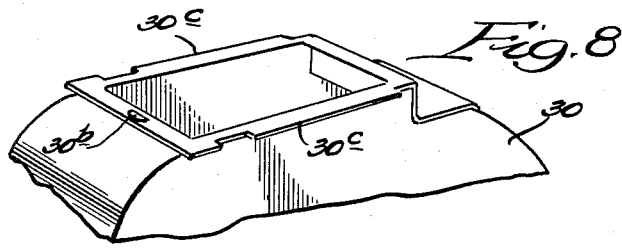
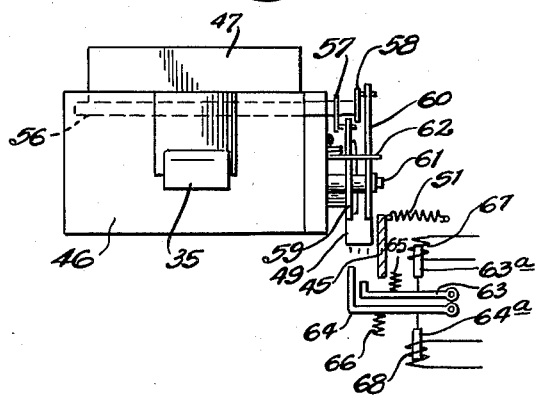
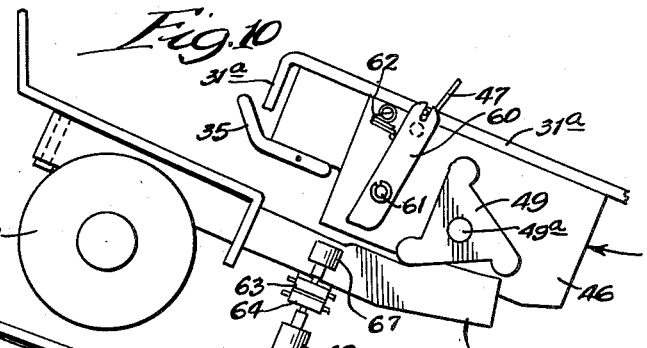
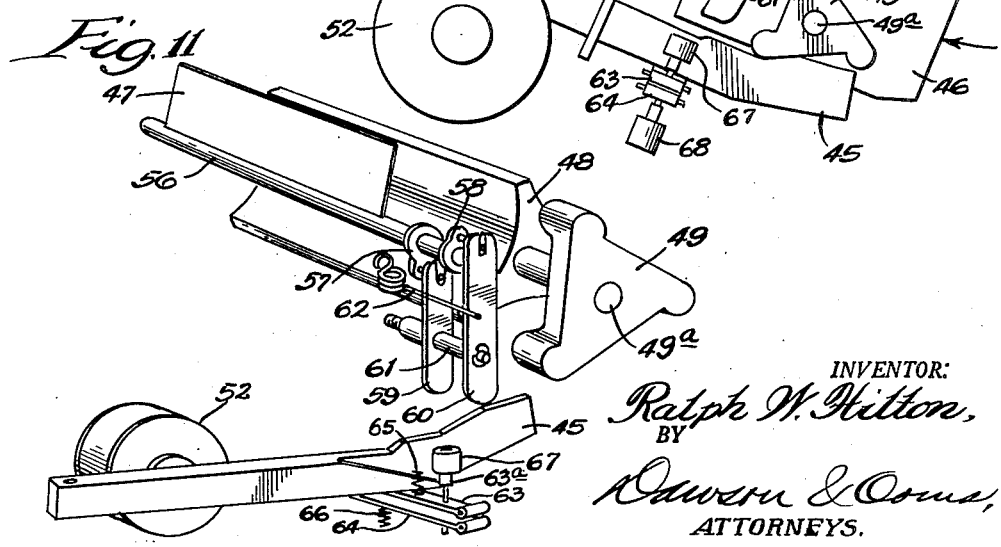
INVENTOR:
Ralph W. Hilton,
BY
Dawson & Ooms,
ATTORNEYS.

March 9, 1954 R. W. HILTON 2,671,575
POWDER STORAGE AND DISPENSING APPARATUS
Filed April 24, 1951 5 Sheets-Sheet 5
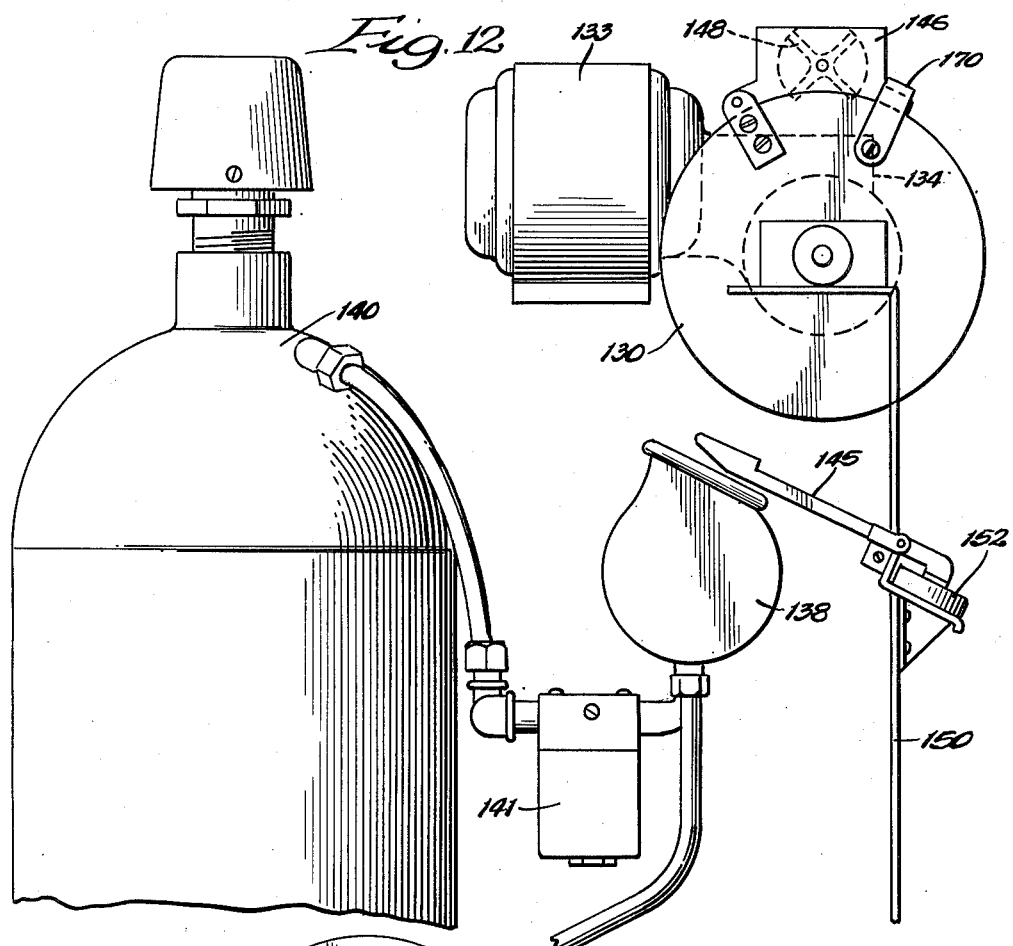
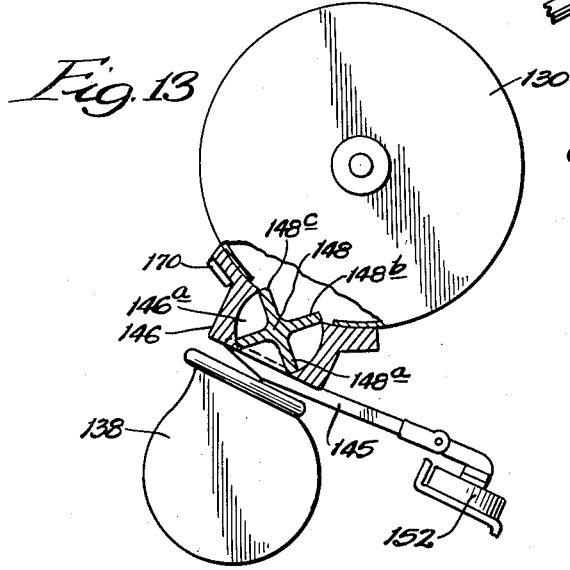
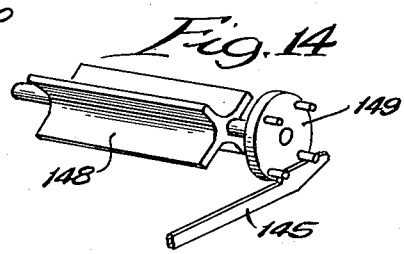
INVENTOR:
Ralph W. Hilton,
BY
Dawson & Ooms,
ATTORNEYS.

Patented Mar. 9, 1954

2,671,575

UNITED STATES PATENT OFFICE 2,671,575

POWDER STORAGE AND DISPENSING APPARATUS

Ralph W. Hilton, Chicago, Ill., assignor to Frank Harmon, Chicago, Ill.

Application April 24, 1951, Serial No. 222,683

19 Claims. (Cl. 222—23)

This invention relates broadly to apparatus for storing and dispensing powder or other finely divided solids; in particular, it has specific application in the field of machines for preparing and dispensing hot beverages.

Automatic machines for dispensing hot beverages have been available for some time, and potentially a very important field of commercial exploitation exists for such machines. Up to this time, however, they have not enjoyed a particularly extensive use, because no consistently satisfactory machine has been available.

The difficulties in such machines have been directly concerned with the problems of storing and compounding the beverages to be dispensed; no particular difficulty has attended the matter of automatic operation in response to the deposit of coins, since the coin-operated machine art is old and well developed. Accordingly, the present invention is directed primarily to the solution of heretofore unsolved practical problems in storage, measurement, and dispensing of powdered beverage-bases.

Any practical coin-operated machine for dispensing hot beverages must store the beverages in the form of dry extracts or beverage bases and compound the beverage in response to a customer's demand, evidenced by the deposit of an appropriate coin or coins. This is particularly true of a machine wherein more than one type of beverage is to be made available to the customer. The requirement just stated exists because the storage in liquid form of several different types of beverages, all to be kept hot, would require a machine of impracticable size and would, furthermore, require elaborate insulation to keep the beverages hot without excessive expenditure of energy for heating. Moreover, in the absence of elaborate insulation, the heat given off by a machine containing large storage tanks of several different hot beverages would heat up to an objectionable extent the air surrounding the machine.

A practical dispensing machine of the type under consideration, therefore, must be one in which the various beverages are stored in the form of powdered beverage bases, and wherein means are provided for compounding the hot beverage from the beverage base and a hot liquid —normally water—when the customer deposits a coin. Such machines broadly are not new— while no satisfactory one has heretofore been forthcoming, numerous attempts in that direction have been made.

All previous attempts in the coin-operated machine art to store beverage bases in powdered form have led to acute difficulties with "caking." The beverage bases, when placed in the storage magazine, have been in powdered form, but they have consistently shown an annoying tendency to cake during storage—due no doubt in part to the presence of moisture. Caking of the beverage base has interfered with the operation of dispensing valves, and many a customer who has paid for coffee has received only hot water, or a faintly coffee-flavored hot water, for his money.

It is a major object of the present invention to provide beverage-base storage and dispensing means wherein the problem of caking is entirely eliminated, by providing for tumbling of the entire contents of every beverage-base magazine in the machine each time any beverage is dispensed from the machine and, if desired, at regular intervals even in the absence of a beverage-dispensing operation. By being thus regularly tumbled—normally many times each day—all the contents of the beverage-base magazines in the machine are maintained in a fluffy, powdered form which will flow freely through, and be accurately measured by, the dispensing valves and be readily dissolved in the mixing chamber when blended with hot water or other liquid.

Another novel feature and object of the present invention is the provision, in a beverage-base magazine, of a unique measuring and dispensing valve which, in response to coin actuation, will deliver to the mixing chamber of the machine an accurately measured quantity of the particular beverage base selected.

A still further object of my invention is to provide, in a dispensing valve of the type just described, a novel adjustable means whereby the customer may select from among a plurality of choices the quantity of beverage base he desires. That highly desirable objective I have provided herein by a novel valve mechanism combined with an adjustable vane or damper having adjusting means under the customer's manual control.

Still another object of my invention is to provide, in a machine for compounding and dispensing hot beverages on order, a novel control structure operative in cooperation with the tumbling apparatus just described to disable the machine with respect to any particular hot beverage whenever the supply of beverage base for that particular beverage is insufficient to give the customer a full measure of properly compounded beverage. Such disabling will normally, by conventional electrical wiring well known in the coin-operated machine art, take the form of lighting a warning sign on the machine's front panel and at the same time providing for a coin refund to any customer who selects the beverage of which the supply is exhausted.

A still further object of my invention is to provide a machine for dispensing a plurality of different types of hot beverages in which the containers for the various beverage bases are adapted to be easily removed from the machine and replaced by full containers of the same size and shape, thus greatly speeding and facilitating service and maintenance of the machine.

Other objects and advantages of my invention will appear as the specification proceeds.

I have in the accompanying drawings disclosed two embodiments of my invention, both of which relate to coin-operated dispensing machines for hot beverages. It is to be understood, however, that my invention is not thus narrowly limited, since the novel structure herein disclosed may have useful fields of application outside the coin-operated dispensing machine art.

In the accompanying drawing, I have shown the physical details of the novel structural elements of the illustrated embodiments of my invention. In the interest of simplicity, however, I have omitted a detailed showing of a number of the conventional parts which are well known in this art and which form of themselves no part of the present invention. Similarly, I have not shown the detailed electrical wiring by which the various illustrated elements are caused to function in response to coin deposits and manual push-button operations, since such wiring is familiar to anyone skilled in the coin-operated machine art and further since such wiring forms per se no part of my present invention.

In the drawing which accompanies this specification, Figure 1 is a perspective view of the cabinet of a coin-operated beverage-dispensing machine made according to the present invention; Fig. 2 is a side view, partly in section, of the working parts of the Fig. 1 invention, showing particularly the manner in which the beverage-base magazines may be installed or removed and bringing out also certain structural details of the machine as a whole; Fig. 3 is a rear view showing the plurality of beverage-base magazines or containers and bringing out also the relative orientation of the magazines, the tumbling apparatus, the mixing chambers, and the hot-liquid reservoir; Fig. 4 is a fragmentary sectional view, taken along a vertical section line showing some of the structural details of one form of dispensing valve embodied in my invention and showing also in section the control apparatus for disabling the machine as to any given beverage when the supply of the base for such beverage is nearly exhausted; Fig. 5 is an exploded perspective view of the various components of such disabling apparatus; Fig. 6 is a sectional view of the dispensing valve of Fig. 4, shown during a rotation of the beverage-base magazine and at the instant immediately before the valve is supposed to discharge a quantity of beverage base into the mixing chamber; Fig. 7 is a view similar to Fig. 6 but showing the position of the dispensing valve and its parts immediately after discharge of a measured quantity of beverage base has been accomplished; Fig. 8 is a fragmentary perspective view showing the appearance of the upper or top portion of a beverage-base magazine prior to its insertion into the yoke which normally holds it in operating position; Fig. 9 is a sketch, partially diagrammatic, bringing out the mechanical and electrical structure of control apparatus for varying the quantity of beverage base dispensed by the valve in response to a given coin actuation of the machine; Fig. 10 is a fragmentary side view in elevation of the structure shown in Fig. 9; Fig. 11 is a fragmentary perspective view of certain parts of the dispensing valve showing clearly the relative orientation of the metering vane and the various cranks and control levers which govern its position during any given dispensing operation; Fig. 12 is a semi-diagrammatic view of certain parts of an alternative embodiment of my invention, including the beverage-base container, the mixing chamber, the tumbling apparatus, and the hot-liquid reservoir; Fig. 13 is a fragmentary view showing the beverage-base magazine of Fig. 12 during a rotation thereof and immediately before the dispensing valve of Fig. 12 commences the discharge into the mixing chamber of a measured quantity of beverage-base powder; and Fig. 14 is a perspective view of the butterfly member which comprises a principal part of the dispensing valve of Fig. 12, together with the cam element and control arm therewith associated.

Referring now to the drawings, Fig. 1 shows in a purely functional sense how a machine of the type under consideration might appear when set up in a public place for use. In practice, it will be understood, the cabinet will normally be extensively decorated and probably provided with display advertising material. No such material appears in Fig. 1, however. I have shown the machine housed in a cabinet 20 and provided with a control panel 21 on which there are provided a coin-insertion device 22, beverage selector dial 23, a "strong-mixture" selector button 24 and a "weak-mixture" selector button 25. The panel also includes a coin-return slot 26 and a windowed compartment 27 wherein the cup falls and the beverage is dispensed in response to a coin deposit.

The apparatus for depositing a cup within the chamber 27 may be conventional and is not herein shown. Similarly, the details of the coin-receptacle apparatus form no part of this invention and are not herein discussed in detail. Such coin-receptacle devices frequently embody electrical relay means for returning the coin to the coin-return slot 26 in response to an electrical impulse; such structure, for example, is found in all coin-operated telephones. It is to be understood that such structure will normally be embodied in a machine made according to my invention. Similarly, the beverage selector switch 23 contains a knob movable to any one of a plurality of choices, and it is to be understood that movement of such knob will actuate a selector switch and thereby determine which of the various dispensing valves will operate responsively to the deposit of a particular coin. Similarly, the "strong" and "weak" selector buttons 24 and 25 will, when pressed, actuate electrical switches and close the circuits respectively to certain solenoids hereinafter disclosed and described. The electrical connections for such control buttons are conventional and will not be herein described in detail.

My invention may be practiced with either a single beverage-base magazine or in a more elaborate machine with a number of such magazines; in the typical machine illustrated in Figs. 1–11, I have shown seven such beverage-base magazines, each of which is identical to the others except for contents and all of which are denoted 30 in the drawing. In the illustrated example, the three beverage-base magazines furthest to the left, as viewed in Fig. 3, might contain respectively black coffee, black coffee with sugar, and coffee with sugar and cream. (The cream normally would be mixed into the powdered beverage base in powdered form.) The next two magazines, counting from the left in Fig. 3, might contain tea without sugar and tea with sugar, while the two magazines farthest to the right might contain respectively bouillon and chocolate.

All the magazines 30 are carried within a supporting yoke 31 which is journaled for rotation in bearings carried by frame 32. A motor 33 and associated gear box 34 are provided as a rotating means for the yoke 31 and the magazines 30 therein carried. By conventional means not herein shown in detail, the motor 33 is energized by each coin deposit in element 22 to cause a complete rotation, through 360 degrees of arc, of the yoke 31 and all the magazines 30 therein contained. While the illustrated embodiment of the invention provides for a continuous rotation through 360 degrees, it is to be understood that such rotation is not essential to the tumbling action contemplated by the invention, and if desired the rotation may take the form of approximately 180 degrees movement in one direction followed by a similar movement in the opposite direction, thus returning the yoke and the magazines to normal position.

As may be seen best from Figs. 2, 4, and 8, the magazines 30 are readily removable from yoke 31, being normally held therein by a lock or latch 35 mounted on the transverse bar 31a which forms a part of yoke 31. The magazines 30 may be provided with a detent 30b in the open top thereof, as shown in Fig. 8, and when the magazine is slid into the proper position in yoke 31, latch 35 engages detent 30b and holds the magazine 30 securely in place. Flanges 30c in the top of magazine 30 may be provided for cooperation with corresponding ways provided on the under side of bar 31a, to further secure the magazines 30 against being accidentally dislodged. When removal of a magazine 30 is desired, to permit replacement with a full magazine, for example, latch 35 may be manually actuated and the magazine 30 then is manually withdrawn by backward movement, as indicated in dotted lines in Fig. 2 by the reference numeral 30a.

In the illustrated embodiment, I have shown a compartmented mixing chamber 38, mounted directly below the magazines 30, as best shown in Figs. 2 and 3. Mixing chamber 38 is provided with an elongated top opening adapted readily to receive powder discharged from the various magazines. In the illustrated example, the mixing chamber is also provided with the parts 38a which divide the chamber into four compartments, each of which is provided with its own outlet spout 39a. The various outlets 39a may be brought to a common discharge point immediately above the cup position in chamber 27.

The purpose of using a compartmented mixing chamber is merely to avoid contamination of one beverage by minute left-over particles of another beverage. For example, to prevent contamination of bouillon by minute particles of powdered chocolate, etc. In a case wherein the machine is dispensing only a single general type of beverage, such as coffee, the compartmented mixing chamber may be dispensed with and a single mixing chamber, designed to receive powder from any one of the magazines, may be used instead.

In the illustrated structure, I have shown a hot-water storage tank 40, provided with a separate control valve 41 and discharge conduit 42 for each of the four compartments in the mixing chamber 38. To accomplish optimum agitation of the liquid in the mixing chamber, in order that the powdered beverage-base may dissolve therein rapidly, each of the discharge conduits 42 is provided with a nozzle member 43, located within the respective compartments of the mixing chamber, as shown best in Figs. 2 and 3. It will be understood that the control valves 41 will, responsively to electrical impulses under the control of the coin receptacle 22, admit to the desired compartment of mixing chamber 38 a metered quantity of hot liquid from the tank 40. Which of the valves 41 will be actuated in a given case will depend upon the setting of selector switch 23. Any desired type of heating means may be provided to maintain the liquid in chamber 40 at the desired temperature. Normally, an electrical heater (not shown) will be most convenient for that purpose.

As may be seen by reference to Figs. 2, 6, 7, 9, 10, and 11, each of the magazines 30 has associated with it a valve-triggering arm 45, mounted on the structural frame 50 and oriented alongside the lowermost position of the magazine 30 with which it is associated. The triggering arms 45 are intended for cooperation with the dispensing valves 46, of which one is provided for each magazine and which are mounted respectively at spaced intervals across the width of yoke 31. As may be noted from Fig. 4, the valve 46 fills and closes off the top opening of magazine 30 when the magazine is in position, so that the contents of magazine 30, while they may be tumbled within the magazine, cannot escape therefrom except through the valve 46.

The various valves 46 consist of a valve chamber having a generally cylindrical bore 46a which is relieved across a considerable arc along the side of valve 46 which, in its normal position, is the top side, and also relieved on the under side to provide communication between bore 46a and the interior of the magazine 30. This last-mentioned opening, denoted 46b, is in the illustrated embodiment, partially obstructed by a movable vane or damper member 47, the construction and function of which will be hereinafter more fully described.

Mounted for rotation within the cylindrical bore 46a is a butterfly member 48, provided with three symmetrically spaced wings or leaves. The leaves of butterfly 48 are machined to fit cylindrical bore 46a with very limited clearance, so that any adjoining pair of leaves and the wall of bore 46a will form a powder-tight seal. Butterfly 48 is mounted on a shaft 49a which is journaled into suitable bearings provided in the end walls of valve 46. At one end of valve 46, shaft 49a is extended slightly beyond the end wall and is terminated in a cam or follower element 49, having three symmetrically spaced rounded projections corresponding generally with the leaves or wings of butterfly 48.

As may be seen from Figs. 4, 6, and 7, valve 46 is normally closed; that is, a pair of the leaves of butterfly 48 normally bridge the outer relieved zone of cylindrical bore 46a so as to prevent the escape of powder from the magazine 30. In the normal position of valve 46, however, the communication passage 46b, connecting cylindrical bore 46a with the interior of the magazine 30, is open, except that it may be partially closed by vane 47. When magazine 30 is in its normal position, however, valve 46 in its entirety is above the contents of the magazine 30 and as a result chamber 46a normally contains no part of the contents of magazine 30.

While each of the magazines 30 has associated with it one of the valve trigger arms 45, arms 45 are normally held in such a position that the respective valves 46 may pass them without any contact or engagement therewith. This normal or withdrawn position of the arms 45 may be accomplished by providing each arm with a restraining spring 51, as shown in Fig. 9, or, if desired, it may be accomplished by designing the arm 45 to have a natural elastic "set" which will hold it clear of follower 49. Thus rotation of yoke 31, and consequently of magazines 30, will not normally have any effect on the various valves 46 and will not cause any of the magazines to discharge any of their contents into the mixing chamber 38, although the contents of all of the magazines will, during such a rotation, be vigorously tumbled. The various chambers 46b will receive some of the powdered contents of the various magazines during the time the magazines are passing through their inverted positions, but all such contents will promptly fall out again as the magazines return to their normal upright positions. Therefore, the only effect of rotation of the magazines is normally to accomplish a thorough tumbling and shaking up of their respective contents.

As has been heretofore explained, one of the outstanding advantages of the present invention is the tumbling feature just described. In a manner to be explained in detail presently, the actuation of the machine by a coin will cause, as to one selected magazine 30, a valve action which will result in dispensing into mixing chamber 38 a measured quantity of beverage base. At the same time, all the other magazines have their contents tumbled. As a result, each coin actuation of the machine provides tumbling of all the beverage-base powder in the machine, even though only one type of beverage base is actually dispensed on such an operation.

To insure that the contents of the magazines are regularly tumbled even during periods of inactivity, an electric clock mechanism (not shown) may be employed, by conventional relay-wiring techniques, to actuate the motor 33 and tumble the magazines 30 at regular time intervals even in the absence of a coin insertion. It will be understood, of course, that the clock-controlled tumbling would not be accompanied by any valve actuation; in other words, the clock relays would be wired to energize motor 33 without actuating any of the valve trigger arms 45. This last-mentioned modification will normally not be necessary for machines placed in railway stations, bus terminals, etc., since they will normally receive a rather continuous patronage from the public. Machines located in factories, and other places wherein the patronage is confined to a few concentrated periods, may be benefited by the addition of the clock-controlled feature just described. Since the addition of such a device to the apparatus shown in the drawings may be accomplished by routine wiring techniques, I have not herein disclosed the details of the relay wiring therefor.

I shall now describe the means by which the valves 46 are selectively actuated in response to the customer's wishes as indicated by his manipulation of selector dial 23 and his insertion of an appropriate coin in receptacle 22.

Each of the trigger arms 45 is provided with an armature 45a adapted for cooperation with a solenoid magnet 52, mounted alongside the armature 45a on the side of arm 45 of magazine 30. Thus, electric actuation of solenoid magnet 52 will draw arm 45 toward magazine 30 and into a position whereat arm 45 will be engaged by follower 49 when magazine 30 is rotated into an inverted position, as shown, for example, in Fig. 6.

It is to be understood, of course, that each of the magazines 30 (and, consequently, valves 46) has its individual valve-trigger arm 45 and solenoid 52.

The wiring of the various solenoids 52 is so arranged that coin actuation via receptacle 22 will actuate relays causing actuation of motor 33 to rotate the magazines and will at the same time supply energizing current to a selected one of the solenoids 52, depending on the setting of selector 23. If the customer sets selector 23 to the position calling for "black coffee," the following coin actuation via receptacle 22 will, in addition to rotating the magazines, supply energized current to the particular solenoid 52 associated with the magazine containing black coffee beverage base. As a result, when the magazines pass through their inverted position, the arm 45 associated with the black-coffee magazine will engage follower 49 and cause the valve 46 on that magazine to dispense into mixing chamber 38 a measured quantity of black-coffee powder. At the same time, of course, the conventional operations will occur, such as the release of a cup into receiving position and the introduction into the proper mixing chamber compartment of a measured quantity of hot water. If selector 23 be placed to select one of the other beverage choices, the same series of events would take place but with respect to a different magazine 30 and its associated arm 45 and solenoid 52.

It is to be observed, from Figs. 6, 7, and 10, that when follower 49 engages the end of arm 45 during the rotation of magazine 30, butterfly member 48 is caused to turn on its own axis through an arc of 120 degrees. This movement results in discharging from space 46a a certain quantity of the contents of magazine 30; the powder thus discharged will of course drop by gravity into the compartment of mixing chamber 38 immediately below. This action is shown clearly in Fig. 7, which shows the magazine 30 and valve 46 immediately after the butterfly member has completed its movement. The discharged powder, denoted 55 in Fig. 7, is shown dropping into compartment 38. Meanwhile, additional powder will drop into space 46a, as shown in Fig. 7, but that powder is not discharged and will in fact drop back into the magazine as soon as the magazine swings upward toward its normal position.

The entire operation of rotating, tumbling, and powder discharge will normally take place in a fraction of a second. The powder actually discharged through valve 46 is only that quantity which is able to flow into cylindrical bore 46a during the brief interval in which magazine 30 is in a substantially inverted position prior to the engagement of follower 49 by arm 45. When arm 45 engages follower 49, of course, butterfly 48 promptly rotates sufficiently to cut off from the interior of magazine 30 the chamber which has been filling and open that chamber instead to the outside, thus discharging the powder into mixing chamber 38.

It will be obvious that in the absence of vane 47, valve 46 would on each operation discharge an identical quantity of beverage base, so long as the magazine 30 contains sufficient powder. Since the tastes of people vary considerably with respect to the desired strength of hot beverages, however, I have provided in the present invention the vane 47, with the associated apparatus now to be described, to give the customer an election whether to take the beverage at normal strength or at a weaker-than-normal or stronger-than-normal concentration. Vane 47, as may be seen from Fig. 11, is mounted on a shaft 56, journaled in suitable bearings carried by the valve casing 46. At the end of shaft 56 nearest follower 49, a pair of crank elements, denoted respectively 57 and 58, are keyed to shaft 56 in opposite relationship; that is, the crank arm of member 57 extends at right angles from shaft 56 in a position diametrically opposite to the crank arm of element 58. Each of the crank arms of members 57 and 58 is provided with a follower pin. The respective crank members 57 and 58 cooperate with levers 59 and 60, which are both pivoted in spaced relation on an axle 61, carried by valve casing 46. The ends of levers 59 and 60 adjacent the crank arms are provided with slots in which the follower pins of the crank arms 57 and 58 are carried. Levers 59 and 60 are urged into the normal position shown in Fig. 11 by any suitable means, for example, a spring 62 as shown in that figure.

As may be seen from Figs. 9 and 11, the follower member 49 is much thicker than the levers 59 and 60, so that by varying the lateral position of arm 45 it is possible to make that arm engage and move either lever 59 or 60 or neither lever, at will, while in all three cases maintaining arm 45 in position for engagement with follower 49. If, at the customer's election, arm 45 is placed in a position to engage lever 60 prior to striking follower 49, lever 60 will move on its pivot and force vane 47 into the wide-open position shown in dotted lines on Fig. 4 and thereon denoted 47a. If arm 45 be oriented to pick up lever 59 before engaging follower 49, lever 49 will likewise turn on its pivot and, by engaging crank arm 57, force vane 47 to the nearly closed position shown in dotted lines on Fig. 4 and thereon denoted 47b. If arm 45 be oriented to engage neither lever, the vane 47 will remain in the position shown in solid lines on Fig. 4. The 47a position of vane 47 will cause valve 46 to discharge a greater-than-normal quantity of beverage base, thus producing a strong mixture, while the 47b position will restrict the amount of beverage base discharged by valve 46 and thus produce a weak mixture. Obviously, the exact position taken by vane 47 in the normal, weak, and strong positions can be controlled by variation of the positions of crank members 57 and 58 on the shaft 56, the choice of pivot position 61, and the dimensions of the other parts. The exact positions of vane 47 to be chosen for a given application may be determined by experiment, and it is by no means necessary that all the vanes 47 in a given beverage machine need be similarly adjusted. That is, a different range of adjustment may be desirable for coffee, for instance, than for tea or chocolate. With some beverages, such as bouillon, a "weak or strong" choice may not be appropriate, and in that event the vane 47 and its associated apparatus may be omitted entirely, the dimensions of the openings in valve 46 being in that event adjusted to give the desired rate of discharge.

I have shown, in Figs. 9-11, an illustrative means by which the lateral position of arm 45 may be shifted to suit the customer's preference as to beverage strength. I have provided, for each of the arms 45, a pair of movable stop members 63 and 64, pivotally mounted in any suitable manner on frame 50 adjacent and below the respective arms 45. Stop member 63 has an upward terminal portion extending at right angles from the body of the stop member; it is maintained normally by spring 65 in a position such that the terminal portion of stop member 63 just clears arm 45, so that arm 45 may be moved laterally past and over stop member 63 without engaging it. Stop member 64 is provided with a similar terminal portion, considerably longer than the terminal portion of member 63, and so oriented in its normal position as to abut against arm 45 when arm 45 is moved laterally toward it. Stop member 64 is held in its normal position by spring 66. Both arms 63 and 64 are equipped, near their respective pivoted ends, with small armatures denoted respectively 63a and 64a. These armatures are received within solenoids 67 and 68 respectively. The solenoids are respectively wired into the electrical circuit of the machine in a conventional manner such that solenoid 67 is energized when, in combination with a coin actuation, the "strong" selector button 24 is pressed, while solenoid 68 is wired so as to receive energizing current when, in combination with a coin actuation, the "weak" selector button 25 is pressed.

As may be best seen from Fig. 11, actuation of solenoid 52 will normally pull arm 45 laterally over stop member 63 and into abutment with the terminal portion of stop member 64. When in that position, arm 45 does not engage either lever 60 or lever 59, and as a result the valve 46 will dispense its "normal" quantity of beverage base, which is the amount delivered with vane 47 in the solid-line position of Fig. 4. When solenoid 67 has been energized as a result of a customer's pressing button 24, stop member 63 is pulled upward and solenoid 52 is thereupon able to pull arm 45 only far enough over to bring it into abutment with the terminal portion of stop member 63. In that position, arm 45 engages lever 60 before it engages follower 49, and as a result vane 47 is shifted to the 47a position during the discharge operation of valve 46. Similarly, if the "weak" button 25 has been pressed, stop member 64 will be drawn downward by solenoid 68, permitting arm 45 to move sufficiently far in a lateral direction to engage lever 59 before engaging follower 49. Under those circumstances, the vane 47 will be moved to the 47b position during the dispensing operation and a weak beverage solution will result.

As may be seen from Fig. 10, the upper surface of arm 45 may be fashioned for cooperation with follower 49 so as to force butterfly member 48 to move through exactly one-third of a turn. While I have found that a modest amount of bearing friction on shaft 49a will hold butterfly member 48 in a proper position between valve operations, any suitable spring detent means may be added if desired to insure that butterfly 48 will not shift its position except under the cooperative action of follower 49 and arm 45.

Referring now to Figs. 4 and 5, I shall describe in detail the novel means provided in my invention for disabling the machine, as to any given beverage, when the quantity of beverage base in the magazine 30 has become so reduced as to provide less than full measure. I have provided, in association with each of the valves 46 spaced along transverse yoke element 31a, a weighing pan 71. Pan 71 is pivoted onto a small bearing member 72 secured to the under side of yoke member 31a. Pan 71 has a small tab or extension 73 extending backward from the body thereof, and tab 73 normally rests in engagement with a pin 74 carried in a bushing 75. The upper end of pin 74 presses a spring relay contact 76, mounted upon but insulated from, yoke member 31a. Supported immediately below spring contact 76 is another contact 77, having an upwardly projecting electrode element 78. Spring contact member 76 has sufficient natural downward "set" to cause it to remain in contact normally with electrode 78, thus providing a closed electrical circuit between elements 76 and 77. Suitable connecting lugs 76a and 77a are provided on members 76 and 77 to permit electrical wiring to be soldered thereto. Weighing pan 71, of course, will normally exert an upward force, through tab 73 and pin 74, on spring member 76. The force thus exerted is insufficient to separate members 76 and 78 when weighing pan 71 is empty, but when it contains a substantial quantity of beverage-base powder, sufficient upward force on pin 74 is exerted to keep contacts 76 and 77 apart.

The connecting wires running from the various lugs 76a and 77a may be brought to a suitable position at one end of yoke 31 and there connected to suitable spring contact terminals mounted on but insulated from the yoke 31. These last-mentioned terminals may, by cooperation with corresponding fixed terminals mounted on frame 32, provide a pathway for suitable electrical circuits from the body of the machine proper to the various switches controlled by the weighing pans 71. Since these electrical connections are conventional and form no part of my invention, I shall not describe them in detail. I will mention, however, that electrical circuits to the various switches controlled by the weighing pans are useful only during periods when the magazines 30 are stationary and in their normal upright positions. Therefore, it is not necessary to use slip rings for these electrical circuits.

The function of weighing pans 71 is to receive, during the rotation of the magazines 30, a small quantity of the powder contents of the magazines. Powder received by pan 71 during the inverted portion of the rotational movement will be held thereon by the back rim 71a of the pans during the return to normal position and the powder on the various pans will add to the weight of the pans and thus increase the force exerted upward through pin 74. If the quantity of material remaining in any given magazine is insufficient to cause enough powder to remain on the weighing pan in that magazine to keep contacts 76 and 77 apart, then the contents are too low to insure full measure to the next customer and service of that particular beverage should be discontinued until the associated magazine 30 has been replaced by a full one. As may be seen from the foregoing discussion, the weighing pans and their associated electrical switches provide at all times between dispensing operations information as to which magazines are provided with an adequate supply of beverage base.

The information derived from the weighing pans and their associated electrical switches may be displayed on the front panel of the machine in any desired conventional manner. If a particular weighing pan does not contain enough powder to break the electrical circuit associated with it, a small warning bulb may be lighted on the selector dial 23 adjacent the selector position associated with the magazine 30 whose contents are exhausted. Alternatively, a bulb may be placed in the selector knob itself and caused to light up and give warning when the selector is placed in a position corresponding to an exhausted magazine. At the same time, it is to be understood that a completed electrical circuit through any of the weighing-pan switches will cause the return of a coin deposited in the machine if the selector switch 23 be placed in a position calling for a beverage corresponding to the exhausted magazine indicated by such completed circuit. As with the other relay wiring details, I have not shown in the drawing the actual wiring, since such wiring is conventional and well known.

In Figs. 12–14 I have disclosed an alternative embodiment of my invention particularly adapted for use in machines wherein it is not necessary that the customer be given a choice as to mixture strength. As with the first-described embodiment, the machine will include the usual conventional elements such as a mixing chamber 138, a hot-liquid storage tank 140, and a hot-liquid control valve 141. Similarly, a plurality of magazines 130 may be used and turned simultaneously as a unit by a motor 133 provided with a gear box 134.

As an alternative to the more complicated construction shown in the first embodiment, I have in the Fig. 12 form of the invention shown the magazines 130 having their respective dispensing valves 146 hinged onto the magazine itself and secured in closed position by a spring latch 170. In this construction, the contents of a given magazine would normally be replenished by releasing latch 170, moving the valve 146, which serves also as a magazine cover, into retracted position, and pouring a new supply of powder into the open top of the magazine. As with the first-mentioned form of the invention, the valve 146 is a butterfly valve, but, rather than the three-leaved butterfly of the first embodiment, I have in the Fig. 12 embodiment shown a four-leaved butterfly member 148, journaled for rotation within a cylindrical bore 146a in valve casing 146.

Butterfly member 148 is rotated by a follower 149 keyed to the same shaft as the butterfly, just as with the first embodiment. Since the four-leaved butterfly is to turn only 90 degrees with each valve actuation, however, the follower 149 is provided with four control projections rather than three, and the trigger arm 145 is correspondingly modified in shape.

It is to be understood that the trigger arms 145 are mounted on frame member 150 and are normally held in a position out of engagement with follower 149, being pulled into position for such engagement by energization of a suitable solenoid 152, just as with the first embodiment. I have, in the Fig. 12 embodiment, shown the trigger arms and actuating solenoids mounted in a position such that arm 145 moves toward follower 149 in the radial direction when solenoid 152 is energized, rather than in the axial direction shown in the first embodiment. It will be understood that this is a mere matter of detail. The radial movement may be conveniently used in the Fig. 12 embodiment, since the functions of arm 145 are substantially simpler than the functions of arm 45 in the first embodiment, since no apparatus for varying mixture strength is involved.

The mode of operation of the four-leaved butterfly valve 146 may be readily seen from Figs. 13 and 14. At the time the magazine 130 is rotated in response to a coin actuation, butterfly member 148 is moved through an arc of 90 degrees as a result of the engagement between follower 149 and arm 145. Such movement causes the powder trapped between butterfly wings 148a and 148b to be discharged into the mixing chamber 138, and at the same time a new supply of powder is trapped in the valve chamber between wings 148b and 148c. This process will continue with each actuation until the powder has been exhausted. A weighing pan apparatus similar to that described with respect to the first embodiment may be used to protect the customer when any particular magazine 130 has become exhausted.

As with the previously described embodiment, the Fig. 12 structure will at all times maintain its beverage-base contents in a fluffy, powdery form, since the contents of all the magazines in the machine are thoroughly tumbled each time the machine is actuated for the dispensing of any beverage. Likewise, clock-controlled means may be provided if desired to tumble the contents of the magazines periodically even in the absence of a coin actuation.

While I have in the present specification described in considerable detail the construction and operation of two embodiments of my invention, it is to be understood that they are illustrative only, and that the scope of my invention is to be determined primarily with reference to the appended claims.

I claim:

1. Powder storage and dispensing apparatus comprising a closed container mounted for rotational movement, having a normal position and a top portion with reference thereto, a normally closed dispensing valve mounted on said top portion, means for intermittently rotating said container through an arc of approximately 180 degrees and then back to its normal position, trigger means mounted near the path traversed by said valve when said container is moving in an inverted position, said trigger means being movably mounted and having a first position wherein said trigger means will engage said valve and open the same as said container moves in an inverted position, causing said valve to discharge a portion of the container's contents, and a second position wherein the trigger means does not engage the valve during any portion of the container's rotational movement, and means operative at predetermined times for actuating said rotating means to move the container through a cycle of rotation and coincidentally therewith to move said trigger means to its first position.

2. Powder storage and dispensing apparatus comprising a closed container mounted for rotational movement, having a normal position and a top portion with reference thereto, a normally closed dispensing valve mounted on said top portion, means for intermittently rotating said container through an arc of approximately 180 degrees and then back to its normal position, trigger means mounted near the path traversed by said valve when said container is moving in an inverted position, said trigger means being movably mounted and having a first position wherein said trigger means will engage said valve and open the same as said container moves in an inverted position, causing said valve to discharge a portion of the container's contents, and a second position wherein the trigger means does not engage the valve during any portion of the container's rotational movement, means operative at predetermined times for actuating said rotating means to move the container through a cycle of rotation and coincidentally therewith to move said trigger means to its first position, and additional means for actuating said rotating means at other predetermined times for rotating said container while said trigger means remains in its second position.

3. Powder storage and dispensing apparatus comprising a plurality of closed containers mounted coaxially for rotational movement, each of said containers having a normal position and a top portion with reference thereto, a normally closed dispensing valve for each of said containers, said valves being respectively mounted in the top portions of said containers, means for intermittently and simultaneously rotating all of said containers through an arc of approximately 180 degrees and then back to their normal positions, a trigger means for each valve, each of said trigger means being movably mounted near the path traversed by its associated valve as the container bearing said valve moves in an inverted position, each of said trigger means having a first position in which said trigger means will engage and open its associated valve as the container bearing said valve moves in an inverted position, causing said associated valve to discharge a portion of the container's contents, and a second position wherein the trigger means does not engage said valve during any portion of the container's rotational movement, means for each trigger operative normally to hold such trigger in its second position, and means selectively operable by a manual selection for rotating all of said containers through a cycle of rotation and at the same time moving a selected one of said triggers to its first position.

4. Apparatus according to claim 1 having also clock-controlled means operative automatically to actuate said rotating means at predetermined intervals to effect movement of said container through a rotational cycle while leaving said trigger means in second position.

5. Apparatus according to claim 1 wherein the valve is provided with means controlled by engagement with said trigger means for opening the valve and closing the same after the discharge of a predetermined volume of the container's contents.

6. Apparatus according to claim 1 wherein the valve comprises a valve housing defining a cylindrical chamber having two oppositely disposed relieved zones, a multi-leaved butterfly member pivoted for movement therein, and means mechanically connected to said butterfly member and operative responsively to engagement with said trigger means for rotating the butterfly member through a predetermined arc.

7. Apparatus according to claim 1 wherein the valve comprises a valve housing defining a cylindrical chamber having two oppositely disposed relieved zones, a four-leaved butterfly member pivoted for rotational movement in said chamber, and means mechanically connected to said butterfly member operative responsively to engagement with said trigger means to rotate said butterfly 90 degrees on its own axis, whereby the material trapped within said chamber between an adjacent pair of said leaves is discharged from said container and a new supply of said contents is received into said chamber and secured therein within the space between the next adjacent pair of butterfly leaves.

8. Apparatus according to claim 1 wherein the valve is provided with a movable member for controlling within limits the rate of discharge of said valve, manually adjustable means for setting the position of said movable member to one of a selection of positions, and means controlled by engagement with said trigger means for opening said valve and thereafter closing the same.

9. Apparatus according to claim 1 wherein means are provided within the container for catching a portion of the container's contents during a cycle of rotational movement and retaining the same until the next cycle of movement commences, and wherein means controlled by said last-mentioned means are provided to cause an indicating signal to be displayed when less than a predetermined quantity of contents has been retained by said first-mentioned means following a cycle of rotational movement by the container.

10. Apparatus according to claim 3 wherein each of said valves is provided with means controlled by engagement with one of said trigger means for opening the valve and closing the same after the discharge of a predetermined volume of the container's contents.

11. Apparatus according to claim 3 wherein each of said valves comprises a valve housing defining a cylindrical chamber having two oppositely disposed relieved zones, a multi-leaved butterfly member pivoted for movement therein, and means mechanically connected to said butterfly member and operative responsively to engagement with one of said trigger means for rotating the butterfly member through a predetermined arc.

12. Apparatus according to claim 3 wherein each of said valves is provided with a movable member for controlling within limits the rate of discharge of said valve, manually adjustable means for setting the position of said movable member to one of a selection of positions, and means controlled by engagement with one of said trigger means for opening said valve and thereafter closing the same.

13. Apparatus according to claim 3 wherein each of said containers is provided with means within said container for catching a portion of the container's contents during a cycle of rotational movement and retaining the same until the next cycle of movement commences, and wherein each of said containers is also provided with means controlled by said last-named means operative to cause a distinctive indicating signal to be displayed when less than a predetermined quantity of the contents of said container has been retained by said first-mentioned means after a cycle of rotational movement.

14. Powder storage and dispensing apparatus comprising a plurality of closed containers mounted for rotational movement, each of said containers having a normal position and being provided with a normally closed dispensing valve, means for rotating said containers simultaneously through an arc of approximately 180° for tumbling their respective contents and then rotating said containers to their normal positions, a valve-actuating means for each valve, having an active state and an inactive state, each of said valve-actuating means being operative when in its active state to open momentarily its said valve in the course of said cycle of rotational movement to cause the container carrying said valve to discharge a portion of its contents, means for each valve-actuating means normally operative to maintain the same in its inactive state, and means selectively operable by a manual selection for actuating said rotating means for rotating all of said containers through a cycle of rotational movement and synchronously therewith placing one of said valve-actuating means in its active state.

15. Apparatus according to claim 14 having also means operative at regular time intervals for actuating said rotating means to effect movement of said container through said cycle of rotational movement without placing any of said valve-actuating means in its active state.

16. In a coin-operated vending machine for dispensing beverages by introducing a charge of beverage base in a liquid and having a plurality of containers for storage of said beverage base, the improvement which comprises means for tumbling the contents of all said containers, combined with means for dispensing a charge of beverage base from a selected one of said containers, said apparatus comprising also a manually operable selector means for selecting the container from which said charge of beverage base shall be dispensed.

17. In a coin-operated vending machine for dispensing beverages by introducing a charge of beverage base in a liquid and having a plurality of containers for storage of said beverage base, the improvement which comprises means for tumbling the contents of all said containers, combined with means for dispensing a charge of beverage base from a selected one of said containers, said apparatus comprising also a manually operable selector means for selecting the container from which said charge of beverage base shall be dispensed, and additional means for tumbling the contents of all said containers at regular intervals without dispensing a charge of beverage base from any of said containers.

18. In a coin-operated vending machine for dispensing beverages by introducing a charge of beverage base in a liquid and having a plurality of containers for storage of said beverage base, the improvement which comprises means for dispensing a charge of beverage base from any selected one of said containers, combined with manually operable selector means for selecting the container from which said charge of beverage base shall be dispensed, and having additional means for tumbling the contents of all said containers at predetermined times between dispensing operations without dispensing a charge of beverage base from any of said containers.

19. In a coin-operated vending machine for dispensing beverages by introducing a charge of beverage base in a liquid and having a plurality of containers for storage of said beverage base, the improvement which comprises means for dispensing a charge of beverage base from any selected one of said containers, combined with manually operable selector means for selecting the container from which said charge of beverage base shall be dispensed, and having additional means for tumbling the contents of all said containers at predetermined times between dispensing operations.

RALPH W. HILTON.

References Cited in the file of this patent

UNITED STATES PATENTS

| Number | Name | Date |
|---|---|---|
| 1,779,839 | Bigelow | Oct. 28, 1930 |
| 2,046,068 | Gray | June 30, 1936 |
| 2,158,795 | Grubelic | May 16, 1939 |

FOREIGN PATENTS

| Number | Country | Date |
|---|---|---|
| 456,846 | Great Britain | Nov. 16, 1936 |